July 10, 1951 W. KAGAN 2,559,821
TRAILER ICE TRUCK AND COOLING APPARATUS FOR BUILDINGS
Filed May 3, 1949

INVENTOR,
WILLIAM KAGAN,
BY
*[signature]*
ATTORNEY

Patented July 10, 1951

2,559,821

UNITED STATES PATENT OFFICE 2,559,821

TRAILER ICE TRUCK AND COOLING APPARATUS FOR BUILDINGS

William Kagan, University City, Mo.

Application May 3, 1949, Serial No. 91,134

6 Claims. (Cl. 62—134)

This invention relates to trailer ice trucks and cooling apparatus for occasional use for the purpose of cooling a public building, such as a church or meeting hall of any kind.

The chief object of the invention is to provide means and apparatus for occasional use, for the low cost cooling and air conditioning of churches and meeting halls of any kind, where large numbers of people occasionally assemble for short periods of time, and when a reasonable degree of comfort is an absolute necessity. However, and due to the size of such halls and churches and the large number of people attending such meetings, the conventional means for cooling and air conditioning such buildings with the usual high tonnage compressors and water recirculating equipment runs very high in cost, and which it is the purpose of this invention to greatly reduce.

Another object of the invention is to provide, in an apparatus of the kind referred to, a trailer ice truck including a wheel-borne chassis, an open water tank in the base of the truck with a water overflow outlet pipe leading out through a wall of the tank in upwardly spaced relation from the bottom thereof, water cooling pipe coils mounted flatly upon the floor of the water tank, means for connecting the intake and outlet ends of the said pipe coils with the ends of the water recirculating pipes of the building to be cooled, a shunt spray pipe connected at its lower end to the pipe coils within the water tank, and extended upwardly and horizontally over the water tank, and spray nozzles mounted upon the elevated and horizontal portion of the spray pipe, for spraying water down over ice as loaded in the truck, for cooling and recirculating the water as pumped through the cooling pipes and radiators of the building under treatment and thence through the cooling pipe coils of the ice trailer, for the purpose of re-cooling the water for recirculation through the pipes and radiators of the building.

Figure 1:
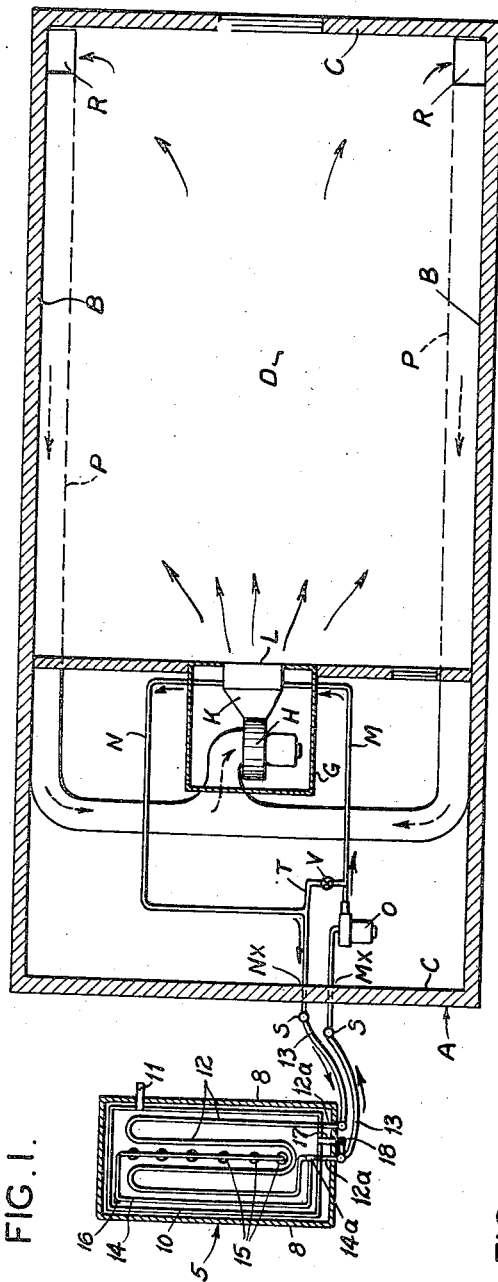

With the stated objects in view, together with such other and additional objects and advantages as may appear from the specification, attention is now directed to the accompanying drawing as embodying preferred forms and structural features of the invention, and wherein:

Figure 1 is a plan view showing the ground floor of a public building, as conventionally equipped with a cooling and air conditioning system including water pipes, a radiator, a pump and blower, and showing also in plan, a trailer ice truck as constructed and piped and otherwise equipped in accordance with this invention, the cooling pipes and coils of the trailer truck being shown as operatively connected with the cooling system of the building.

Figure 2:
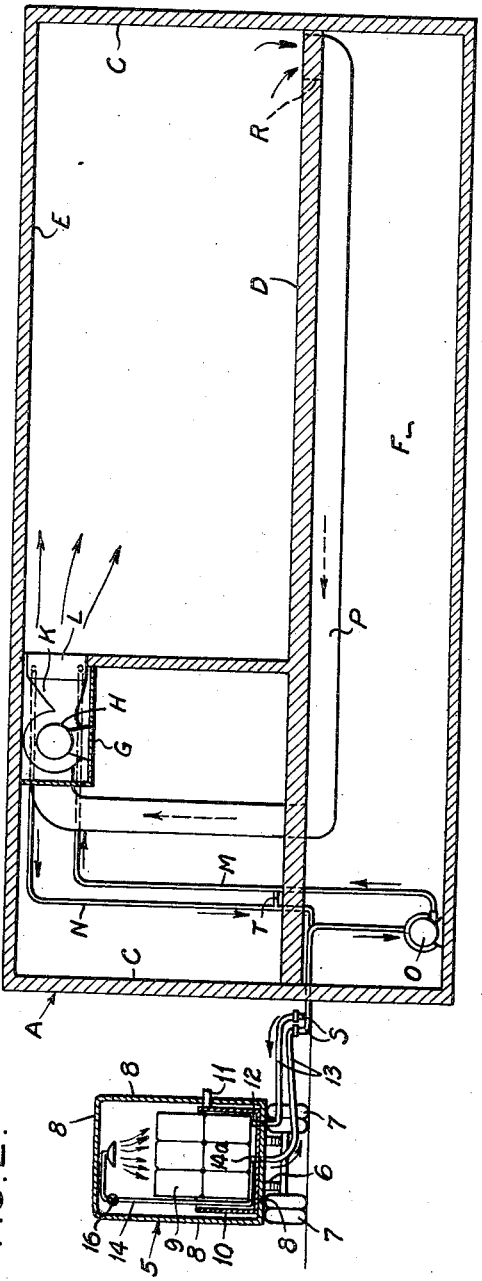

Figure 2 is a longitudinal vertical section through the building and trailer ice truck as shown in Figure 1.

The trailer ice truck comprising the principal subject matter of this invention is designed for use in the occasional cooling and air-conditioning of a public meeting hall or auditorium here referred to generally at A, and which includes side walls B, end walls C, floor D, ceiling E and basement F. Such auditorium or hall conventionally is equipped with air conditioning and cooling apparatus including a small air chamber or housing G suspended from the ceiling E at the outer end of the hall, an electrically energized blower H mounted in the chamber with its air delivery funnel K directed out through the inner end of the chamber for blowing air towards the interior of the hall through the radiator L positioned within the mouth of the funnel K, this radiator being piped as at M and N for circulating water therethrough from the electrically energized pump O located in the basement F and incorporated in the piping and water circulating system as shown, for forcing water through the same. Air ducts or channels P are conventionally installed in such halls, the same being extended along under the floor D and along the ceiling of the basement at each side, the inner ends of these ducts opening up through the floor registers R, and the outer ends being extended up through the floor and led into the air chamber G for feeding air to the blower H. Thus the air is cooled by being blown through the cold water radiator L, and the cooled air is recirculated through the hall. The outer ends of the water pipes M, N, are turned downward together, as shown, and are extended down through the floor and then turned horizontally outward through the frontal end wall C, as shown at Mx, Nx, and are equipped at their upturned extremities at ground level with pipe couplings S. A short by-pass or cross-pipe T connects the pipes M and N at their outer ends and this pipe T is provided with a cut-off valve V.

The foregoing matter relates to and describes conventional air-conditioning apparatus and equipment as provided for public buildings of the kind referred to. The co-operating component of this conventional air conditioning apparatus of a public hall consists of a specially constructed and equipped trailer ice-truck referred to generally at 5. This truck comprises a chassis 6 carried on wheels 7 and provided at its forward end with conventional means (not here shown) for hitching to a motor vehicle such as a motor truck, for transportation from place to place, or from one building or hall to another, in the operation of the system.

The trailer truck 5 is completely enclosed at sides, ends, top and bottom, as indicated at 8, but a hinged door (not shown) is provided at the rear end for the insertion of ice cakes 9 into the truck. A metallic and open topped water tank 10 is seated in the bottom of the truck 5, being substantially co-extensive with the area of the bottom, and an overflow spout 11 is seated horizontally through the sides of the truck and water tank as means for discharging excess of water resulting from the melting of ice, in the operation of the apparatus. Radiant water pipe coils 12 are arranged flatly in the bottom of the water tank 10, the ends 12a of these coils being extended out through the rear ends of the water tank and truck, and flexible hoses 13, with suitable connections at their ends, are provided for connecting the hoses to the extended ends Mx, Nx, of the water pipes M and N. Thus the system and apparatus for forcing the circulation of water through the pipes and radiant coils of the building and connected trailer ice truck, by means of the pump O, is completed. In addition to the foregoing a shunt pipe 14 may be connected at 14a to the pipe coils 12 in the bottom of the tank 10, this pipe being extended upward and horizontally around to the opposite end of the truck, and again turned medially and longitudinally rearward, and being equipped at this inturned end with spray nozzles 15 positioned directly over the ice cakes 9 as loaded within the truck 5. A cut-off valve 16 is seated in a bend of the upper horizontal extension of the spray pipes, whereby the sprays may be turned onto the ice 9 at will, for melting same and more quickly filling the tank 10 with ice cold water. Additionally, a short shunt pipe 17, with cut-off valve 18, connects at one end with the out-flow pipe 13 and is passed through the ends of the truck and water tank, thus opening freely into this tank. By this arrangement the cold water in the tank 10 may be drawn directly therefrom and circulated through the system, by merely opening the valve 18. If necessary, the usual thermostatic equipment may be added to the apparatus within the building.

It is thought that the construction, use and operation of the system and apparatus for cooling and air-conditioning a public hall, will be fully understood from the foregoing description. The advantages of this invention lie in the fact that many of the very expensive structural features incident to the old methods of air-conditioning public halls for temporary or occasional use, are eliminated, as above pointed out. An operator of one of these trailer ice trucks simply loads it with ice and hitches it to a motor vehicle and hauls it to the desired location, where the pipes of the truck are connected with the pipes of the building to be air-conditioned. This operation can be completed at one building in two or three hours, sufficiently to cover the time period of the usual meeting, after which the operation may proceed to another hall where a meeting is to be held later in the day.

And while I have here shown and described a particular embodiment of the invention and system involved, it is understood that the same may be changed as desired, within the scope of the claims. For example, the ice and water tank and radiant coils, and extension with spray nozzles, and pipe couplings, may be constructed as a separate unit and removably mounted in a conventional trailer truck for the described use in warm weather. Thus in cold weather, when such air conditioning service would not be required, this unit could be removed from the truck, making the latter available for use for other purposes.

I claim:

1. For use in the occasional cooling and air conditioning of a public hall or the like, said hall being equipped with conventional water circulating piping, radiant water-coils, blowers and pump, and the said piping including intake and outlet pipe-joints extended outwardly of the building, a trailer ice-truck for supplying cold water to the circulatory system of the hall, the said truck comprising a wheel-borne chassis and body and means for connecting same to a motor vehicle, an open topped ice and water tank in the bottom of the truck, radiant water coils in the tank and including an overhead extension thereof equipped with spray nozzles for spraying water down upon ice as loaded into the truck for the purpose of providing cold water in the tank for circulating through the piping and radiant coils of the hall, a water intake pipe-coupling joined to one end of the radiant water coils in the tank and extended outwardly of the truck, a water discharge pipe coupling extended directly from the tank at the bottom thereof and projected outwardly of the truck, and flexible hoses each having one end connected to the said intake and discharge couplings and arranged and adapted at their outer ends to connect with the said inlet and outlet pipe-joints as extended outwardly from the hall building.

2. In a trailer ice truck according to claim 1, the said truck being completely enclosed at the sides, ends, top and bottom and provided with a door for the loading of ice into the truck.

3. In a trailer ice truck according to claim 1, an overflow spout leading out from the said tank, and the said water discharge pipe coupling being extended inwardly at its inner end and connected to the radiant water coils in the tank, a valve-controlled shunt pipe joint connected at its outer end with the outer end of the discharge pipe coupling and passed freely into said water tank, and a control valve seated in the said overhead spray pipe extension, whereby the water may be confined for circulation entirely through the radiant coils in the tank of the truck, the spray pipes being eliminated, or may be drawn directly from the open tank, as may be desired, by manipulation of the valves in the spray pipes and shunt pipe joint.

4. In a trailer ice truck according to claim 3, the said truck being completely enclosed and provided with a door for loading ice thereinto.

5. A trailer ice-truck for occasional use in the cooling and air conditioning of a public hall or the like, said hall having therein a conventional water circulating system, the said trailer ice-truck comprising a wheel-borne chassis completely enclosed at the sides, ends, top and bottom, and provided with a door for the loading of ice into the truck, an open topped ice and water tank seated in the bottom of the truck, an overflow spout extended from the tank near the top thereof outwardly through a wall of the truck, a water discharge pipe coupling extended from the tank at the bottom thereof out through a wall of the truck, a system of water-pipe coils disposed flatly in the water tank, an intake coupling joined to one end of the pipe coils and extended out through a wall of the tank and a wall of the truck, a spray pipe connected to the opposite end of the pipe coils and extended vertically towards the top of the truck, and thence turned horizontally over the said pipe coils within the tank, spray nozzles depended in spaced relation from the elevated horizontally extended portion of the spray pipe, a control valve seated in the spray pipe, and flexible hoses connected to the said intake coupling and discharge coupling for connecting the water pipe coils and tank of the truck with the pipes of the circulating water cooling system of the said hall, and whereby ice may be loaded into the said tank and the cold water resulting from the melting thereof may be circulated through the cooling system of the hall.

6. In an apparatus according to claim 1, and means for connecting the said flexible hoses with the said circulating water system of the hall.

WILLIAM KAGAN.

REFERENCES CITED

The following references are of record in the file of this patent:

UNITED STATES PATENTS

| Number | Name | Date |
| --- | --- | --- |
| 1,893,228 | Copeman | Jan. 3, 1933 |
| 2,113,359 | Stebbins | Apr. 5, 1938 |

OTHER REFERENCES

Heating-Ventilating-Air Conditioning Guide (1945), volume 23, page 460, Figure 9; published by American Society of Heating and Ventilating Engineers, New York.